(12) United States Patent
Lee (10) Patent No.: US 11,883,718 B2
(45) Date of Patent: Jan. 30, 2024

(54) MAGNETIC CONTROL DEVICE FOR DIRECTLY SENSING THE MOTION LOAD VALUE

(71) Applicant: CHIA HUA FITNESS CO., LTD., Hsinchu County (TW)

(72) Inventor: Chia Jung Lee, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 221 days.

(21) Appl. No.: 17/220,304

(22) Filed: Apr. 1, 2021

(65) Prior Publication Data

US 2022/0314076 A1    Oct. 6, 2022

(51) Int. Cl.
*A63B 24/00*   (2006.01)
*G01L 3/22*   (2006.01)
*A63B 21/22*   (2006.01)
*A63B 21/005*   (2006.01)
*H02K 49/04*   (2006.01)
*H02K 7/104*   (2006.01)
*H02P 3/12*   (2006.01)
*H02P 15/00*   (2006.01)

(52) U.S. Cl.
CPC ...... *A63B 24/0087* (2013.01); *A63B 21/0056* (2013.01); *A63B 21/225* (2013.01); *A63B 24/0062* (2013.01); *G01L 3/22* (2013.01); *H02K 7/104* (2013.01); *H02K 49/043* (2013.01); *H02P 3/12* (2013.01); *H02P 15/00* (2013.01); *A63B 2024/0093* (2013.01); *A63B 2220/54* (2013.01); *A63B 2220/833* (2013.01)

(58) Field of Classification Search
CPC ... A63B 24/0087; A63B 24/00; A63B 21/005; A63B 21/0056; A63B 21/22; A63B 21/225; A63B 24/0062; A63B 2024/0093; A63B 2220/54; A63B 2220/833; G01L 3/16; G01L 3/22; H02K 7/104; H02K 49/04; H02K 49/043; H02P 3/12; H02P 15/00

See application file for complete search history.

(56) References Cited

U.S. PATENT DOCUMENTS

| | | | |
|---|---|---|---|
| 8,026,647 B2 * | 9/2011 | Seo | H02K 7/025 188/161 |
| 10,250,107 B2 * | 4/2019 | Lee | H02K 7/02 |
| 10,391,348 B2 * | 8/2019 | Gibson | A63B 21/00072 |

* cited by examiner

*Primary Examiner* — Tulsidas C Patel
*Assistant Examiner* — Joshua Kiel M Rodriguez
(74) *Attorney, Agent, or Firm* — Rosenberg, Klein & Lee (57) ABSTRACT

A magnetic control device for directly sensing the motion load value especially the one that has a magnetic resistance mechanism which is "floating" and pivoted on the inner edge of the outer ring body of a flywheel; an acting rod, one end of is locked on the outside of the magnetic resistance mechanism and synchronized with it, and the other end has a pressure applied member connected to the beam load cell; a torque value conversion unit for converting the load value of the beam load cell into a torque value; so as to achieve directly measuring the motion load value, which has the effect of improving the detection accuracy.

3 Claims, 13 Drawing Sheets

MAGNETIC CONTROL DEVICE FOR DIRECTLY SENSING THE MOTION LOAD VALUE

BACKGROUND OF THE INVENTION

1. Field of the Invention

The invention relates to a fitness equipment, especially to one that has a magnetic control device for directly sensing the motion load value t having the beam load cell with the magnetic resistance mechanism for achieving the desired motion load and having a magnetic control device which can directly sense the motion load value.

2. Description of the Related Art

Figure 11:
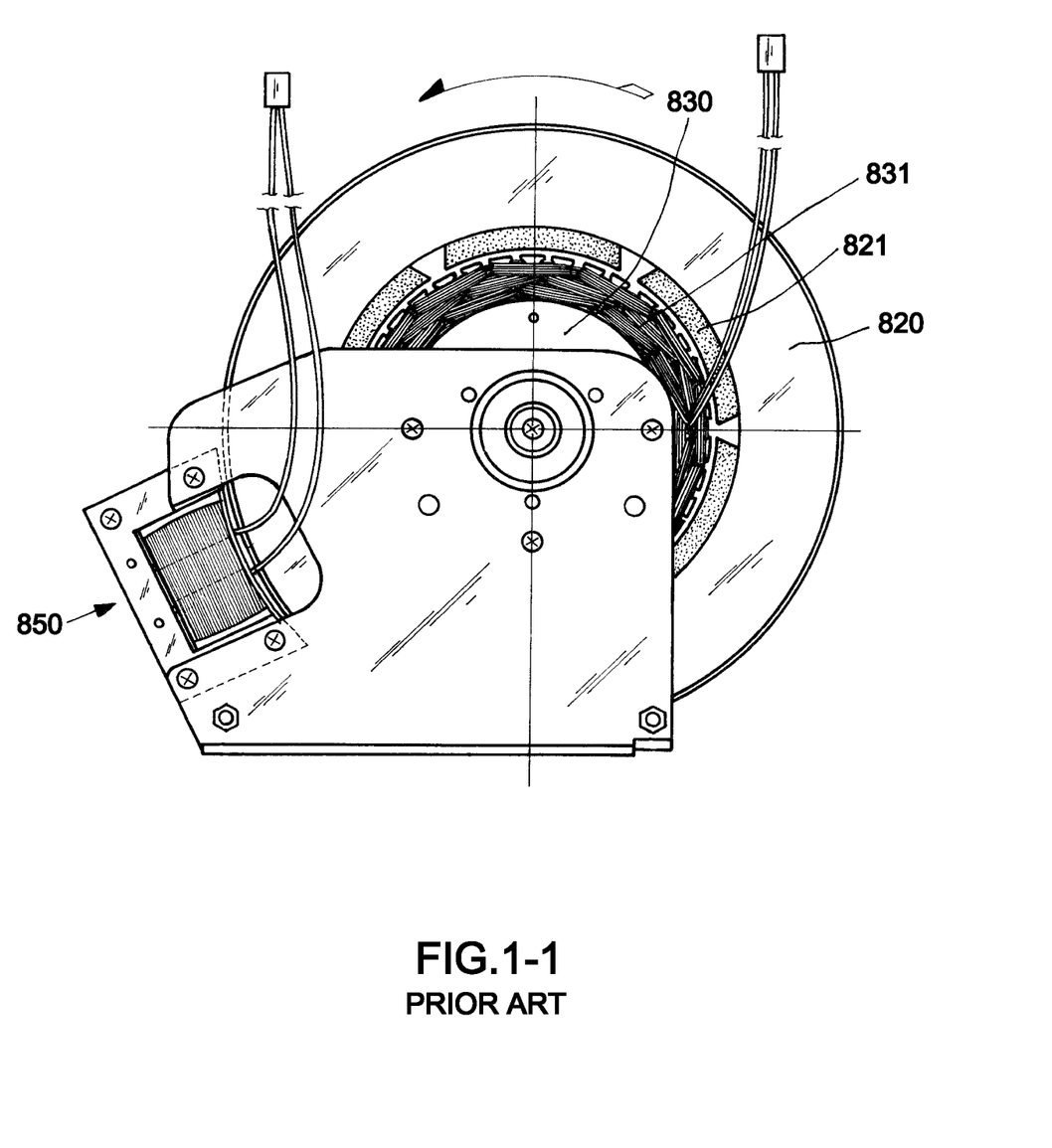
Figure 12:
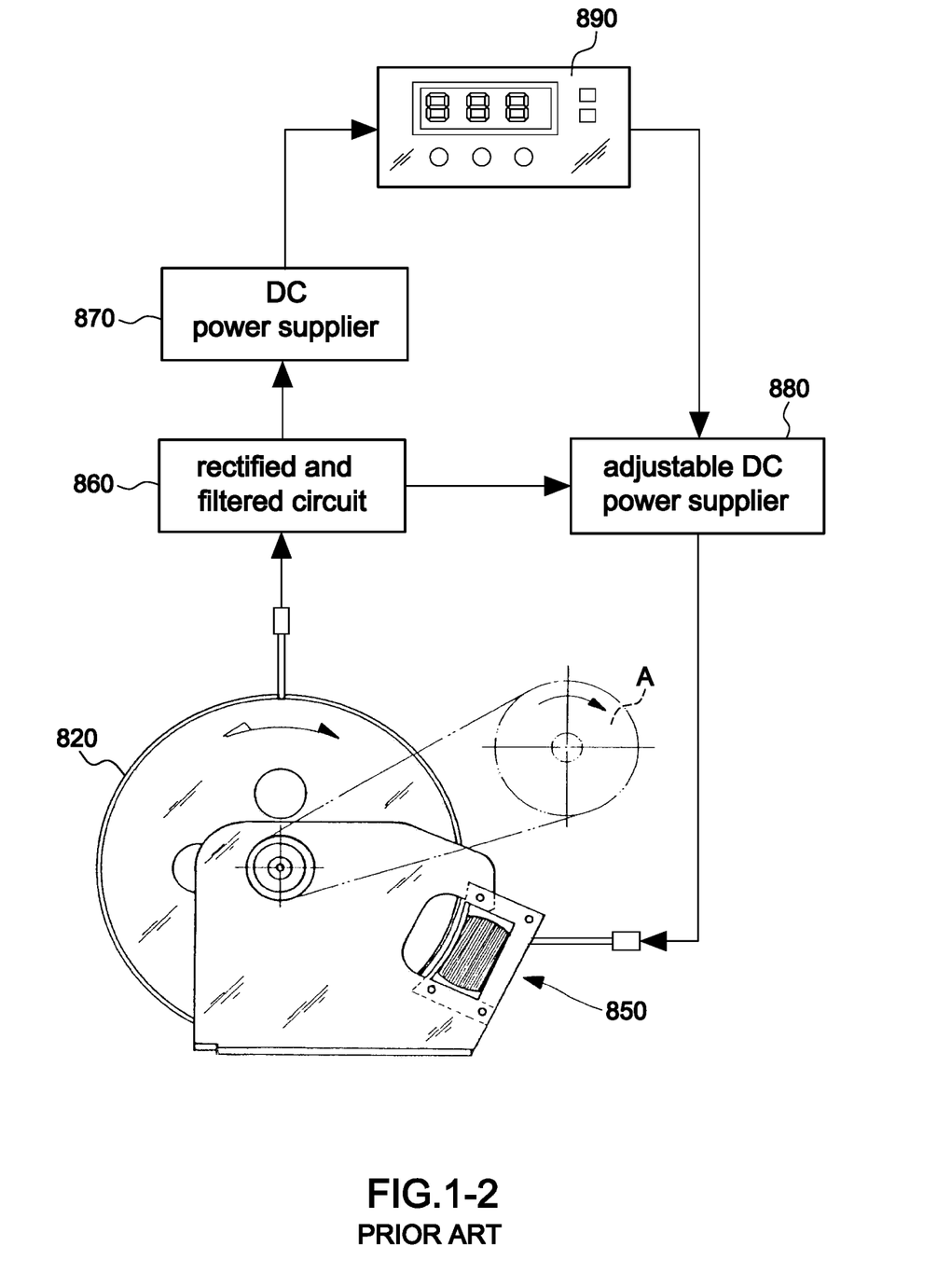

The flywheel is widely used in many fitness equipment for providing exercise load by the inertia of rotation. In recent years, fitness equipment often uses flywheels installed with permanent magnets, and uses armatures as stators to make stator coils generate current to be the power that provided for the control and the brake load FIG. 1-1 and FIG. 1-2 of U.S. Pat. No. 6,084,325 depict a brake device with a combination of power-generating and eddy-current magnetic resistance. The device includes: a flywheel 820 rotated by the rotate wheel A. The flywheel 820 is affixed to a permanent magnet 821 and a stator core 830 to form a magnetic circuit, and to cause the coil 831 generate current which is subsequently rectified and filtered into DC by a rectified and filtered circuit 860, which provides power to the control panel 890 through the DC power supplier 870. The power is also provided to the brake field core 850 through the adjustable DC power supplier 880, thus causing the brake field core 850 generate an eddy current, subsequently resulting in a reluctance effect to flywheel 820.

The afore-mentioned prior art system generates power by using force applied to the fitness equipment, and then supplies power to the magnetic resistance mechanism for creating the exercise load. This structure can achieve excellent exercise effects, but the large current and large magnetic resistance generated by the mechanism are suitable for installation on a large equipment, or a fitness device having more control functions. If however, a fitness equipment requires only low current and low magnetic resistance, usage of the above-mentioned device leads to waste of resources. Therefore, it is desirable to reduce the motion load, size and the manufacturing cost of a fitness system, and to integrate the magnetic resistance mechanism with small fitness equipment.

The control panel 890 in the aforementioned prior art system converts the set torque value into a current value and supplies the brake field core 850 to cause magnetic resistance to the flywheel 820. However, the device does not have a torque detection mechanism, and a small deviation between the magnetic resistance and the setting values may cause a user's confusion about the exercise effect. Therefore, adding a feedback device for torque detection to improve the user's trust in fitness equipment would be a desirable improvement.

SUMMARY OF THE INVENTION

It is a primary objective of the present invention to provide a beam load cell which connects with the magnetic resistance mechanism for achieving direct detection of the motion value and for improving load detection accuracy.

It is another objective of the present invention to provide an eddy current magnetic resistance brake device that permits applicability of the magnetic resistance mechanism to the small fitness equipment.

In order to achieve the above objectives, the present invention includes: a supporting frame having a front frame body and a rear frame body fixed by multiple positioning rods, where the support frame has a fixing base for fixing on the frame of the fitness equipment. A shaft center is pivoted in a shaft hole of a bracket for receiving the power transmitted by the fitness equipment. A flywheel has an outer ring body at the outer periphery, and a wheel nave is arranged at the shaft center. The wheel nave has a shaft hole for setting the wheel nave on the shaft center. The shaft center drives the flywheel to rotate.

The present system further includes a magnetic resistance mechanism, which includes a coil activity frame surrounding the wheel nave and activated for causing the magnetic resistance mechanism to floatingly pivot relative to the inner periphery of the outer ring body of the flywheel. A stator is arranged at the outer periphery of the coil activity frame, where the stator is surrounded with multiple brake field cores, which have a containing space for arranging a magnetic coil. An input line is connected to the magnetic coil.

The present system further includes an action lever secured at one end outside the magnetic resistance mechanism and further linked to the magnetic resistance mechanism. The other end of the action lever has a pressure applied member.

A beam load cell is secured to the supporting frame by a load cell bracket. An outer end of the beam load cell is connected to the pressure applied member, and the inner end of the beam load cell has a load signal output line for sending the load value.

A torque value conversion unit is also provided for converting the load value received by the beam load cell into a torque value.

A control circuit unit is provided which is arranged at the lateral side of the supporting frame. The control circuit includes a micro processor control interface electrically connected to the torque value conversion unit, a power control unit, and a DC power supplier which is connected to the AC power. The control circuit unit inputs the desired torque value, and is electrically connected to the input line and the beam load cell of the magnetic coil. The control circuit unit generates a control signal to attain an appropriate current after the control circuit unit calculates the desired torque value and simultaneously supplies the appropriate current to the magnetic coil of the magnetic resistance mechanism. The current of the magnetic coil will form an eddy current on the brake field core, which results in generation of a resistance to the rotation of the flywheel, so that the resistance will drive the magnetic resistance mechanism to floatingly pivot, and by applying the resistance to the beam load cell by the action lever, the control circuit unit will repeatedly capture the resistance value to compare with the desired torque value, and then further change the delivered current, so that to cause the actual load to attain the exercise effect of the desired torque value.

The present system further includes a ball bearing arranged between the coil activity frame and the wheel nave of the flywheel for the coil activity frame to floatingly pivot relative to the flywheel.

Also, a belt wheel is arranged on the shaft center which is disposed outside the supporting frame for making the fitness equipment transmit power to the shaft center.

The present invention has the following benefits:

1. The flywheel is driven by the shaft center to rotate, where the magnetic resistance mechanism is arranged at the inner periphery of the outer ring body of the flywheel, and has multiple brake field cores and the magnetic coil. Since the magnetic resistance mechanism of the present invention is arranged at the inner periphery of the flywheel, the size and the manufacturing cost can be reduced, so that the present system is applicable to the small fitness equipment. In addition, the present invention controls the magnetic resistance load by the magnitude of the current applied to the magnetic coil, and, since the mechanism is a non-contact resistance device, the present invention also has the advantages of easy control of resistance, no wear of components, and low maintenance cost.
2. The present invention includes a flywheel that provides inertial rotation, and the magnetic resistance mechanism is arranged on the inner periphery of the outer ring of the flywheel, where, when an appropriate current is input to the magnetic coil of the magnetic resistance mechanism, the current of the magnetic coil will form an eddy current on the brake field core, which causes a resistance to the rotation of the flywheel. Since the brake field core is set at the inner periphery of the flywheel, the resistance of the eddy current will be evenly distributed on the inner periphery of the flywheel, so that the present invention can provide a symmetrical and smooth load effect.
3. The micro processor control interface of the present invention has an input unit for inputting the desired torque value, responsive to which the micro processor will generate a suitable current through the torque value conversion unit to the magnetic coil of the magnetic resistance mechanism to form an eddy current on the brake field core so as to provide a resistance to the rotation of the flywheel. Because a beam load cell is connected to the magnetic resistance mechanism through an action lever to measure its resistance, the control circuit unit repeatedly captures the resistance to compare with the desired torque value, and then the delivered current is further changed, so that the load value reaches the desired torque value. Because the beam load cell is used as the actual load sensing device in the present invention, and the control circuit unit will send the feedback signal to correct the magnitude of the current it delivers, then the accuracy of its load can be increased to more than 95%, so that the present invention truly fits the user's exercise benefit.

BRIEF DESCRIPTION OF THE DRAWINGS

FIG. 1-1 is a schematic diagram illustrating a structure of a hybrid braking device for power generation and eddy current magnetic resistance according to the prior art;

FIG. 1-2 is a schematic diagram illustrating the control of the hybrid braking device for power generation and eddy current magnetic resistance according to the prior art;

DETAILED DESCRIPTION OF THE PREFERRED EMBODIMENT

For better understanding of the present invention, I provide the embodiment and drawing enclosed for detailed description. Those who are skilled in the art can understand the purpose, the features and benefits of the present invention from the contents disclosed in this specification. Kindly noted that the present invention can be implemented or applied through other different specific embodiments and based on different viewpoints various details in this specification can be various changed without departing from the spirit of the present invention. In addition, the drawings attached to the present invention are merely a schematic illustration and they are not depicted in actual dimensions. The following embodiments will further describe the related technical content of the present invention in detail, but the disclosed content is not intended to limit the technical scope of the present invention.

Figure 2A:
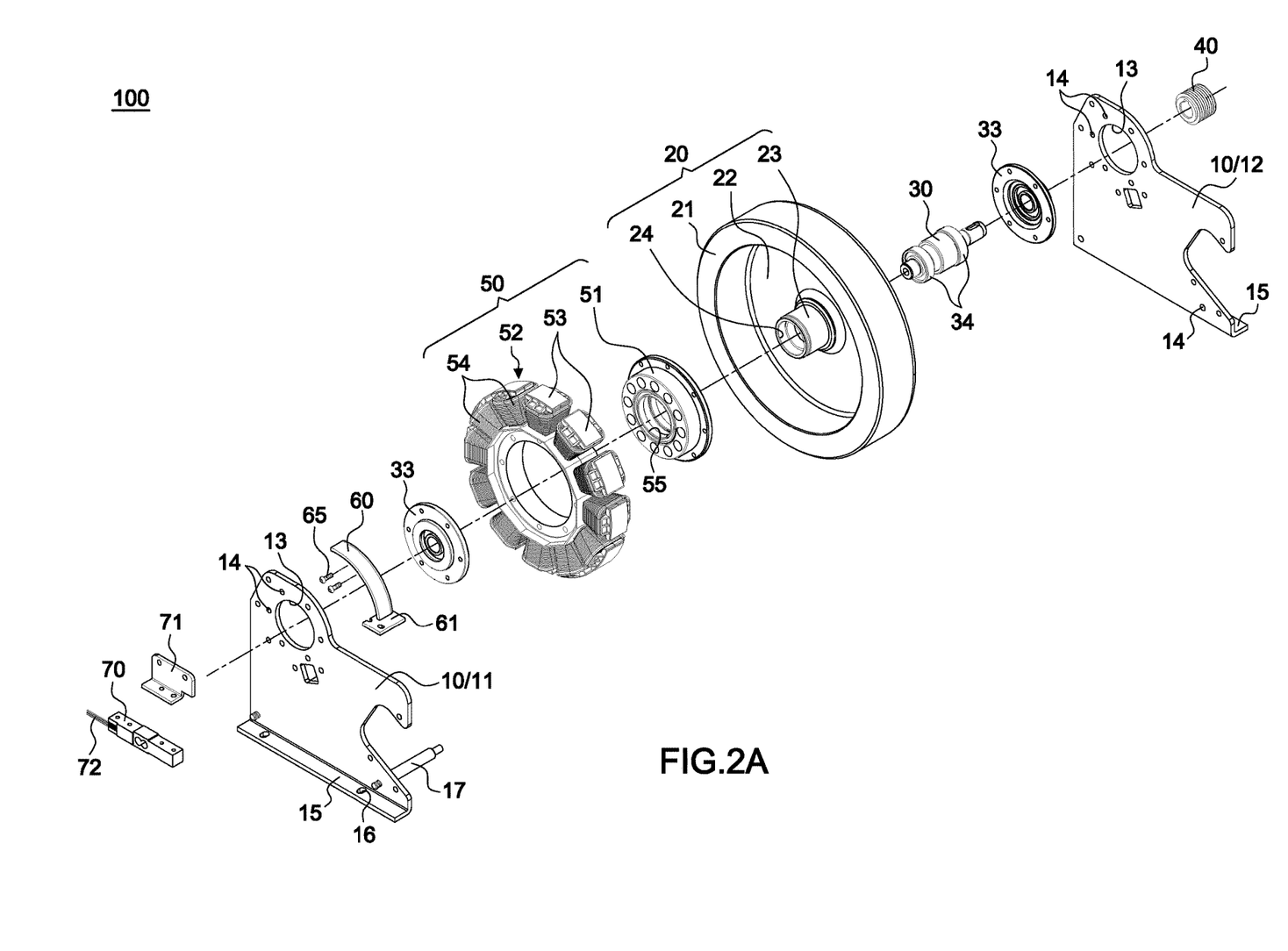
FIG. 2A is an exploded perspective view of the present invention.
Figure 8:
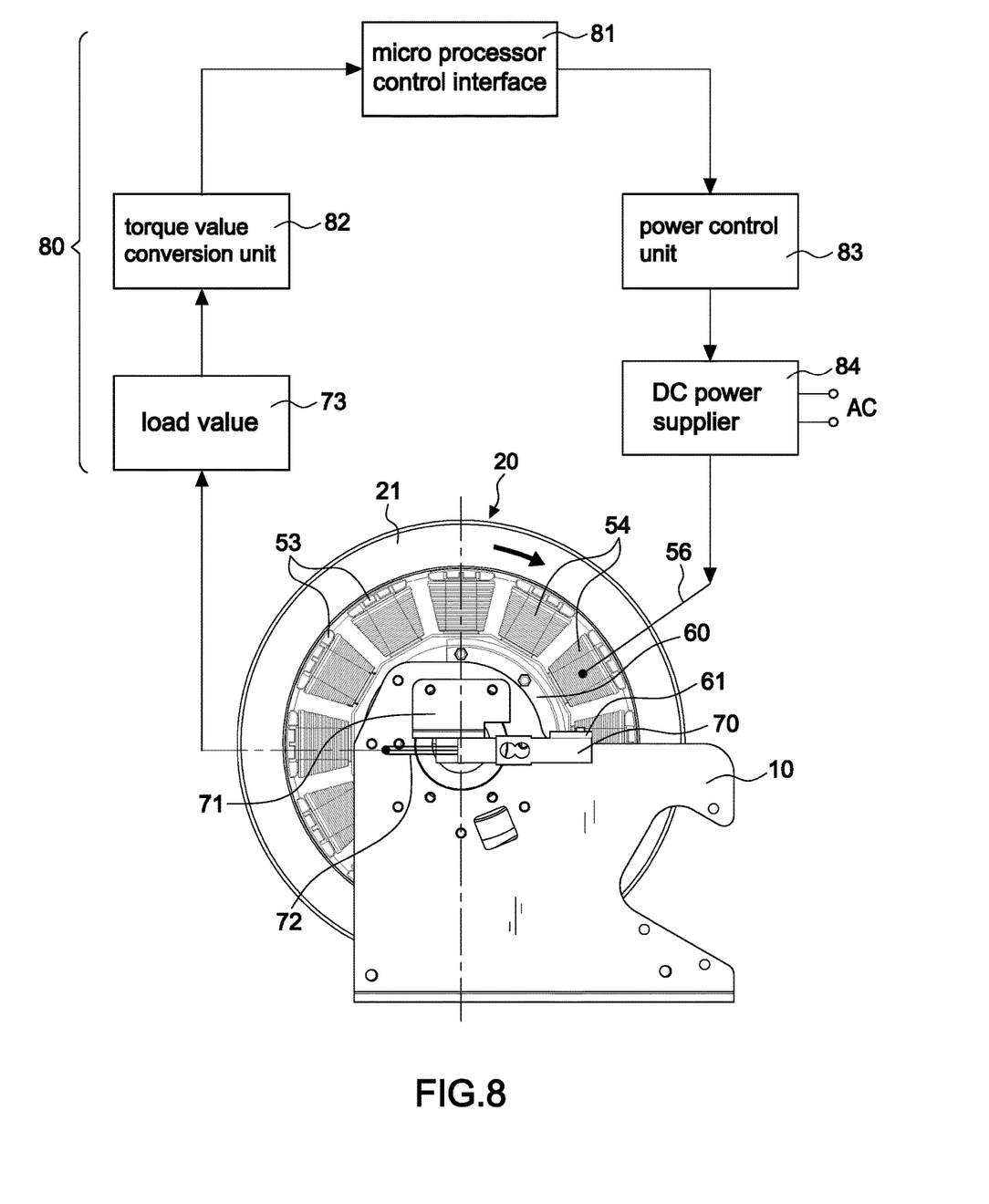
FIG. 8 is a schematic diagram illustrating the control of the present invention.

Referring to FIG. 2A, the magnetic control device for directly sensing the motion load value for fitness equipment 100 comprises: a supporting frame 10, a flywheel 20, a shaft center 30, a magnetic resistance mechanism 50, an action lever 60, a beam load cell 70, and a control circuit unit 80 which is best shown in FIG. 8. The supporting frame 10 is formed with a front frame body 11 and a rear frame body 12. The top ends of each of the front and rear frame bodies (also referred to herein as boards) has a shaft hole 13. Each of the boards has multiple positioning holes 14. The positioning holes formed at the front frame body 11 are aligned with the positioning holes formed at the rear frame body 12. Multiple positioning rods 17 are set trough the positioning holes 14 and locked with nuts, so that the front frame body 11 and the rear frame body 12 can be integrated into one body. The lower end of each board is provided with a fixing base 15, and the supporting frame 10 can be fixed to the frame of fitness equipment by a fixing slot 16.

The flywheel 20 is a disc body that provides an inertial rotation, having an outer ring body 21 and an inner side body 22, and the center of the inner side body 22 forms a wheel nave 23 with a shaft hole 24.

The shaft center 30 is a shaft for transmitting power, with the middle section of the shaft center 30 extending into the shaft hole 24 of the flywheel 20. Both ends of the shaft center 30 are provided with a ball bearing 34 to penetrate a bearing housing 33, and the outer end is connected to a belt wheel 40 through a key to receive the power transmitted by the fitness equipment and to drive the flywheel 20 and the shaft center 30 to rotate synchronously.

Also, the magnetic resistance mechanism 50 includes a coil activity frame 51 and a stator 52 arranged at the outer periphery of the coil activity frame. The stator 52 has multiple brake field cores 53 surrounding the stator, where the brake field cores 53 have a containing space for arranging the magnetic coil 54.

An input line 56, as shown in FIG. 8, has one end connected with DC power, while the other end of the input line 56 is connected in series with the magnetic coil 54, where the input current will form an eddy current on the brake field core 53.

The coil activity frame 51 has an axial through hole 55, which is movably sleeved on the outer edge of the wheel nave 23 of the flywheel 20, so that the magnetic resistance mechanism 50 is floatingly pivoted in the outer ring body 21 of the flywheel 20. When the eddy current is destroyed by the rotating flywheel 20, a resistance is generated and acts on the magnetic resistance mechanism 50. The action lever 60 has a pressure applied member 61, one end of which is fixed on the outer side of the magnetic resistance mechanism 50 with a screw 65 so that it can be driven to floatily pivot synchronously with the magnetic resistance mechanism 50. The beam load cell 70 is locked through a load cell bracket 71 on the supporting frame 10, its outer end is connected to the pressure applied member 61 of the action lever 60, and the inner end is provided with a load signal output line 72 for sending a load value 73, therefore, the resistance value will be measured by the beam load cell 70 by the action lever 60.

Figure 2B:
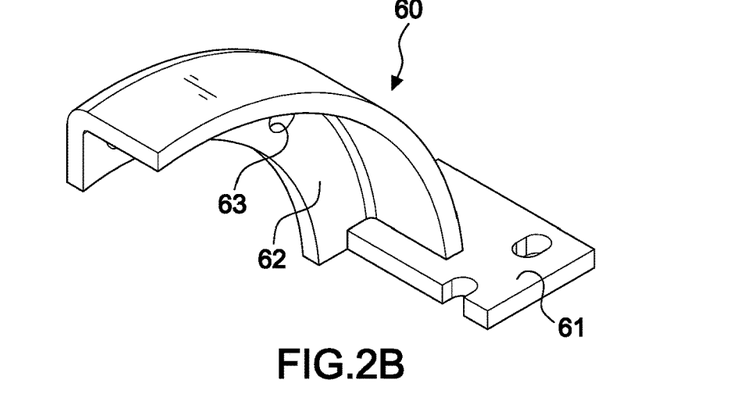
FIG. 2B is a perspective view illustrating the action lever of the present invention.
Figure 2C:
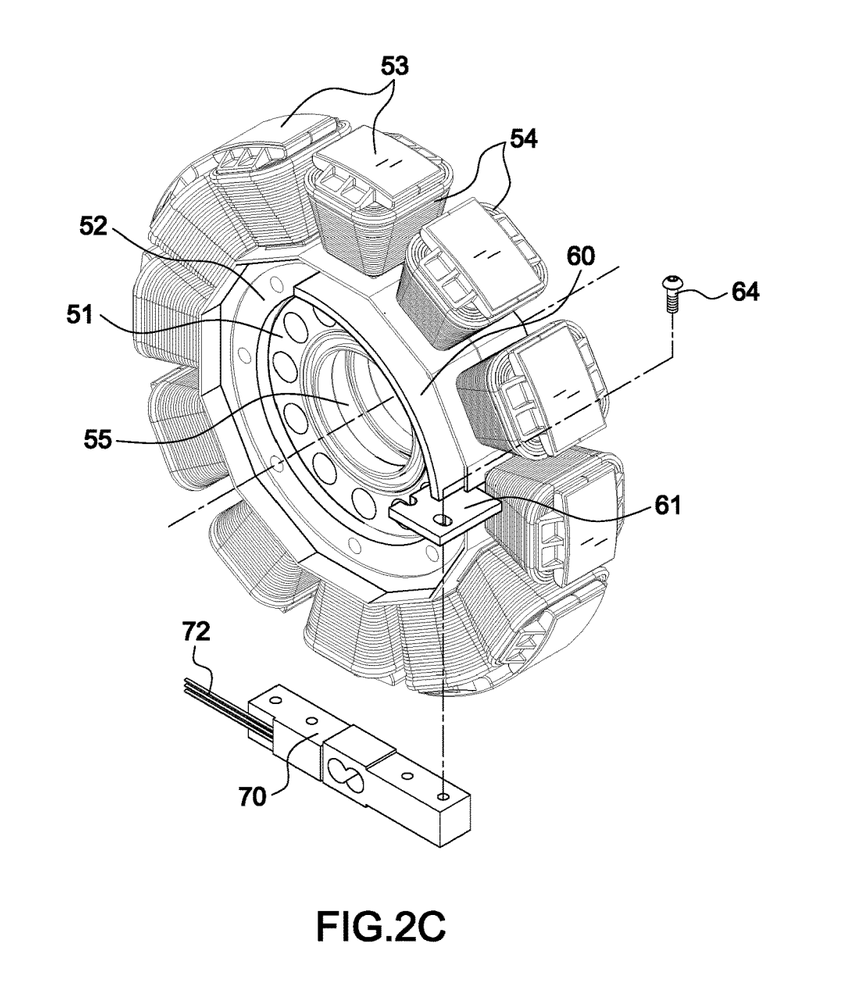
FIG. 2C is a perspective view illustrating the structure of the present invention which senses the motion load value.
Figure 2D:
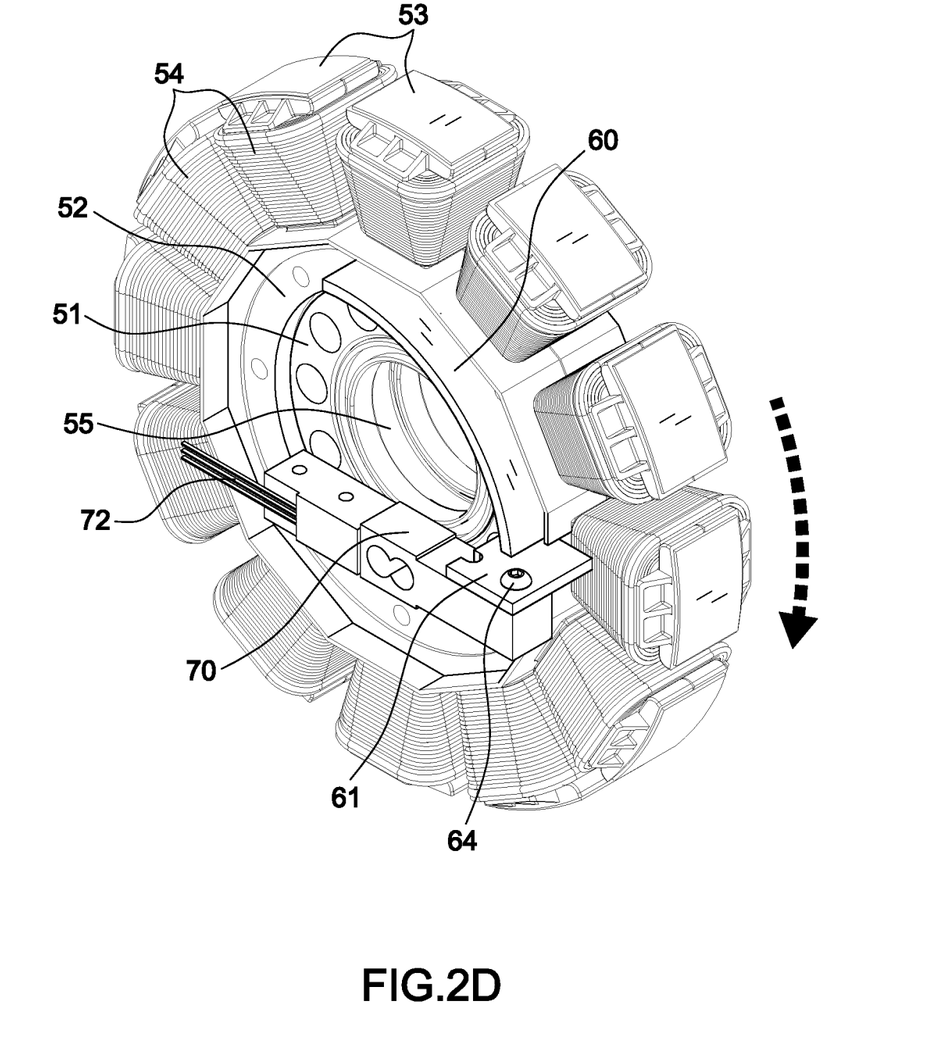
FIG. 2D is a perspective view illustrating the combination of the structure of the present invention which senses the motion load value.

Referring to FIGS. 2B-2D, which show the combination status of the action lever 60 and the magnetic resistance mechanism 50, wherein the action lever 60 has a pressure applied member 61 and a curved shape positioning member 62, where the positioning member 62 has multiple positioning holes 63 as shown in FIG. 2B. When the action lever 60 is locked on the side edge of the stator 52 with a screw 65, and the beam load cell 70 is connected to the pressure applied member 61 of the action lever 60 with a screw 64, when the magnetic resistance mechanism 50 is having resistance and pivot floatingly, the action lever 60 will be driven to pivot floatingly, and the floating force will be applied to the beam load cell 70, as shown in FIGS. 2C-2D.

Figure 3:
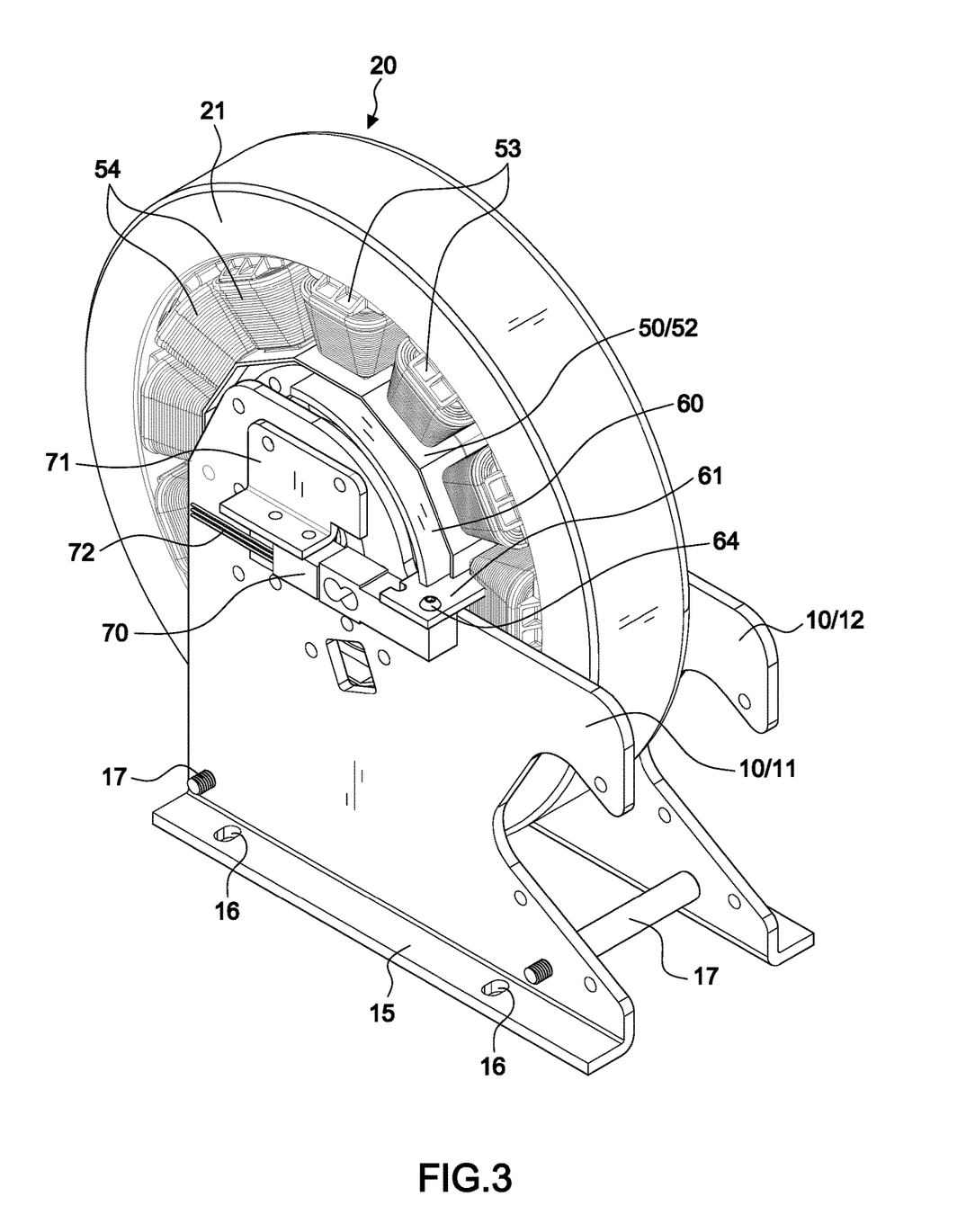
FIG. 3 is an assembly perspective view of the present invention.
Figure 4:
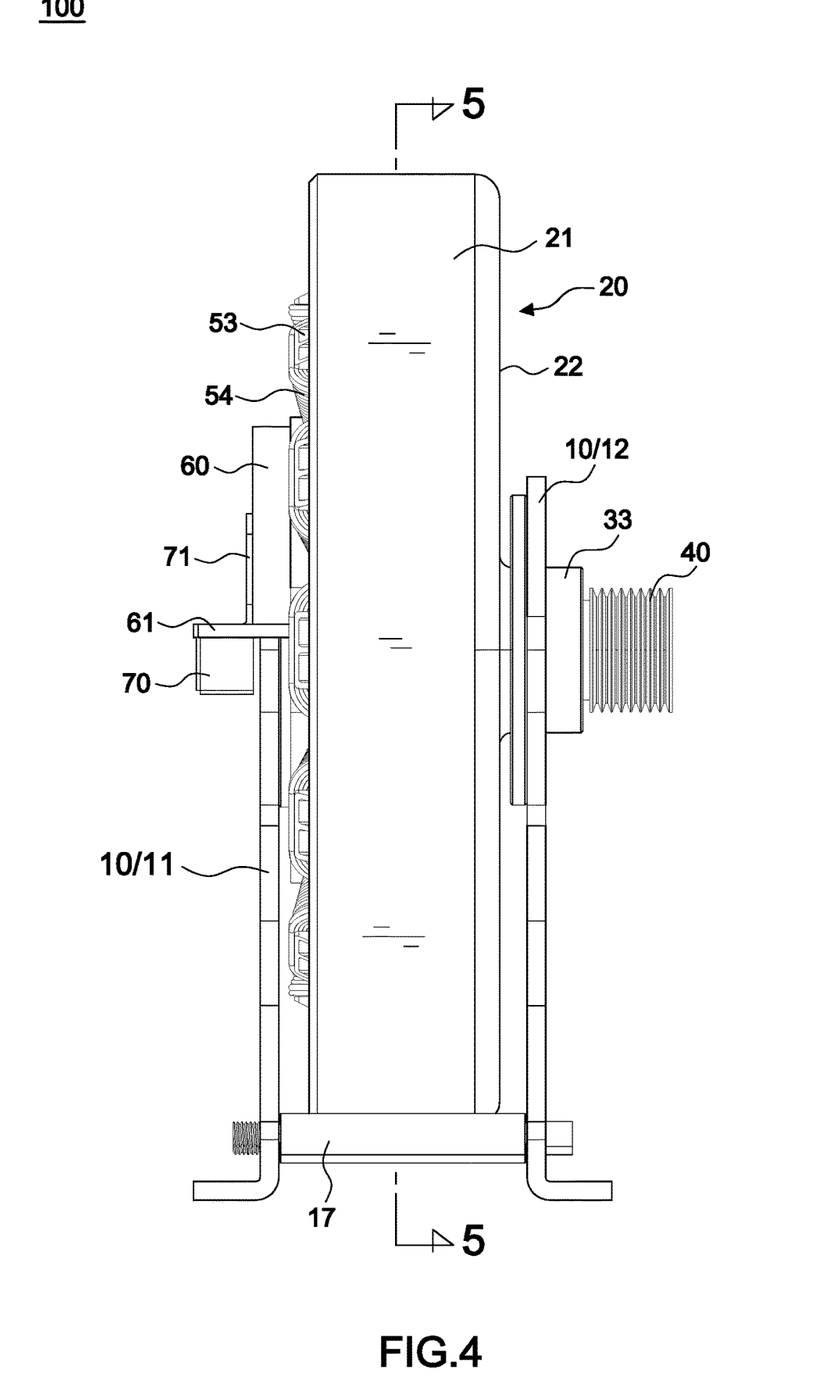
FIG. 4 is a side view of the present invention.
Figure 5:
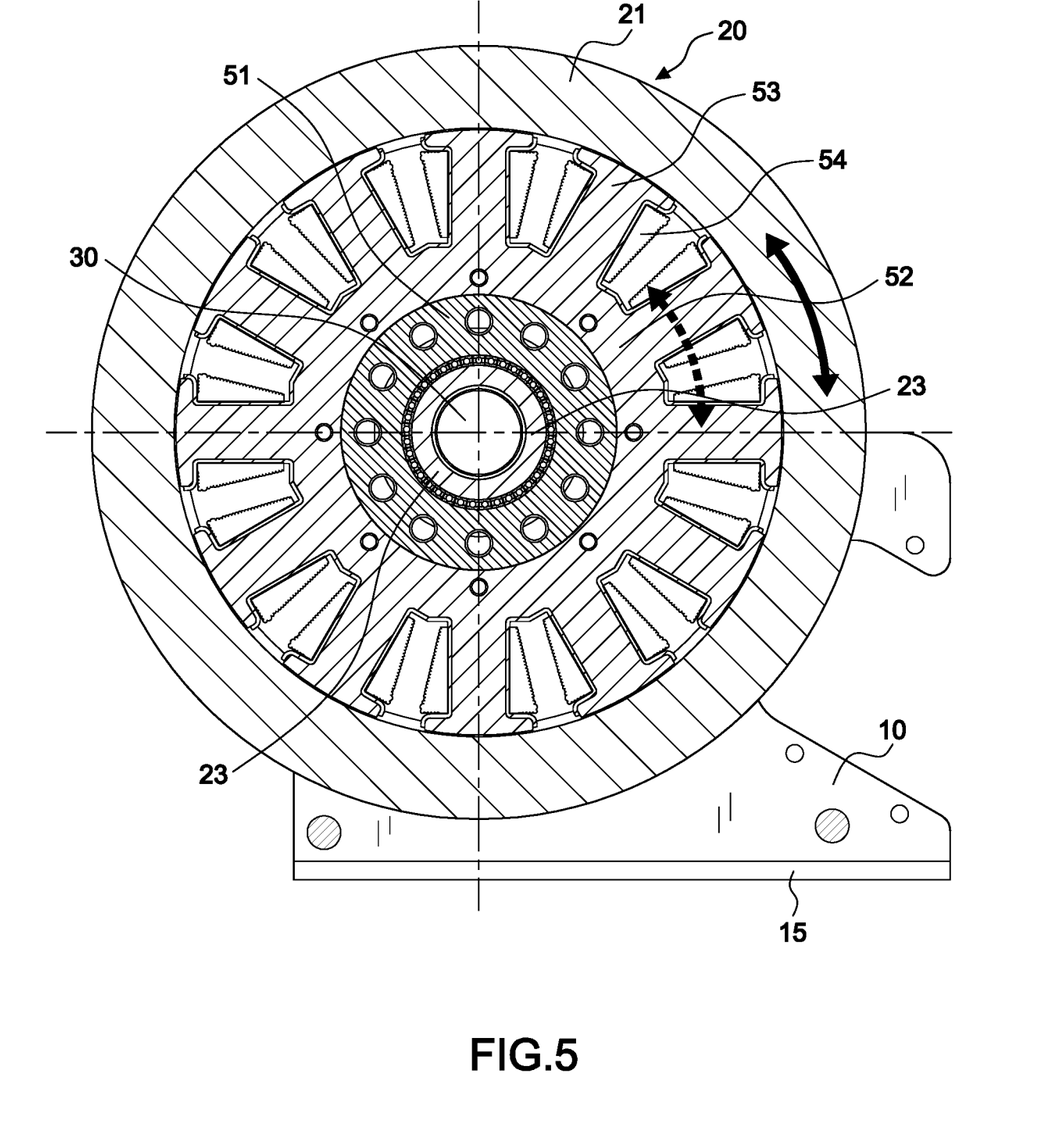
FIG. 5 is a sectional view taken along line 5-5 in FIG. 4.

Referring to FIGS. 3-5, the stator 52 includes multiple brake field cores 53 and the magnetic coil 54, which are secured at the outer edge of the coil activity frame 51 by the screw, and thus forms the magnetic resistance mechanism 50. The axial through hole 55 of the coil activity frame 51 is disposed at the periphery of the wheel nave 23 of the flywheel 20 for enabling the magnetic resistance mechanism 50 to pivot at the outer ring body 21 of the flywheel 20.

The present system further includes a ball bearing 25 arranged between the wheel nave 23 and the axial through hole 55 of the coil activity frame 51, so that the coil activity frame 51 can floatingly pivot relative to the flywheel 20.

Also, the shaft center 30 passes through the shaft hole 24 of the flywheel 20. By using a key block inserted into the middle section of the shaft center, the shaft center 30 and the flywheel 20 rotate simultaneously. At both sides of the shaft center 30, of the wheel nave 23, and of the flywheel 20 there is a ball bearing 34, which has a bearing housing 33 at the outer periphery of the ball bearing 34. The bearing housing 33 is inserted into the shaft hole 13 of the front frame body 11 and rear frame body 12 and secured by a set of screws to the positioning holes 14 of the front frame body 11 and rear frame body 12, with the multiple positioning rods 17 extending through the positioning holes 14 and secured by nuts for securing the shaft center 30, the flywheel 20 and the magnetic resistance mechanism 50 to each other inside the front frame body 11 and rear frame body 12. Furthermore, the belt wheel 40 is embedded to the outer end of the shaft center 30 by a key block, and, after securing the positioning member of the action lever 60 at the lateral side of the stator 52, securing the beam load cell 70 on the supporting frame 10 by a load cell bracket 71, and finally securing the pressure applied member 61 of the action lever 60 at the outer end of the beam load cell 70, the assembling of the present system is accomplished.

Figure 6A:
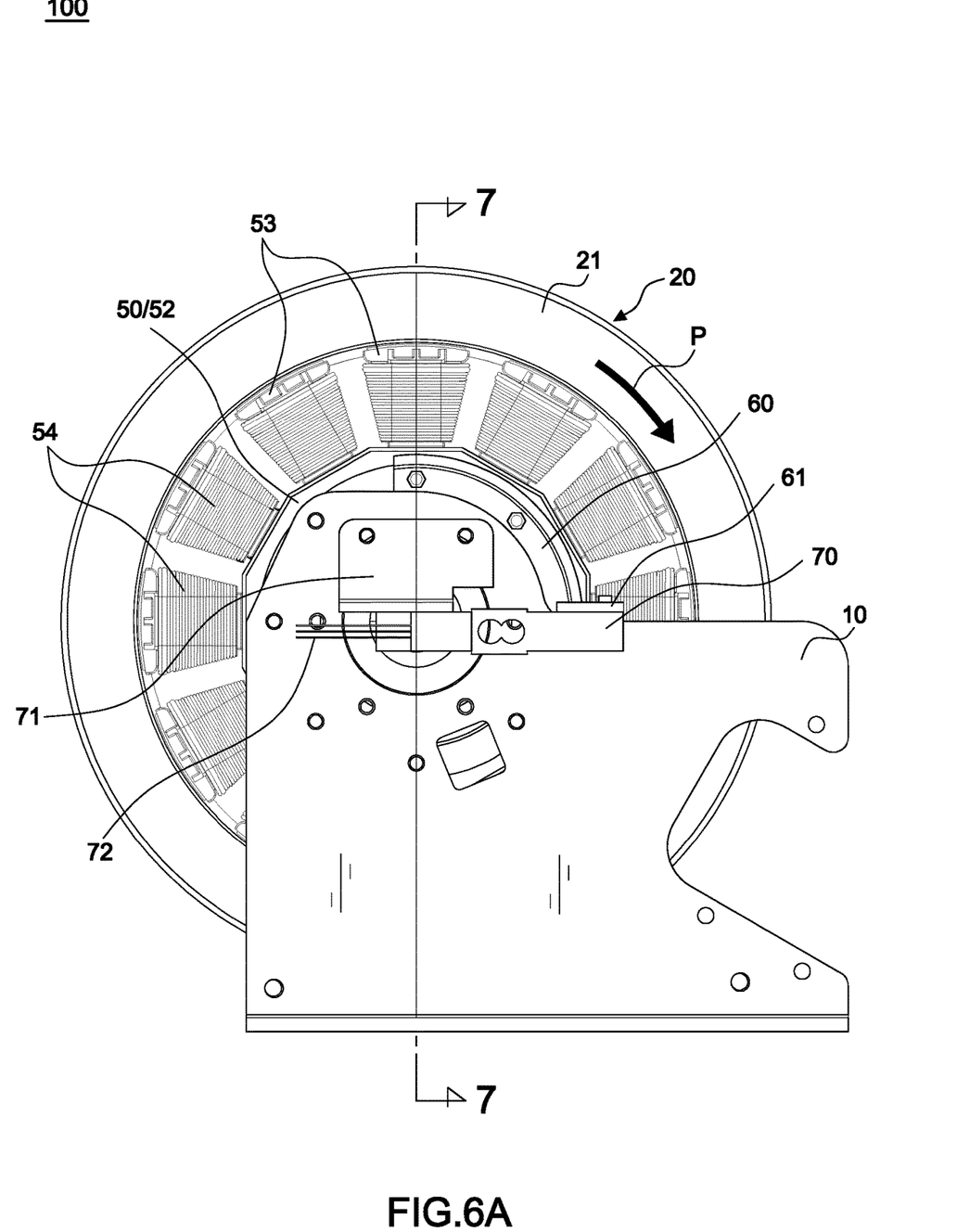
FIG. 6A is a front view of the present invention.
Figure 6B:
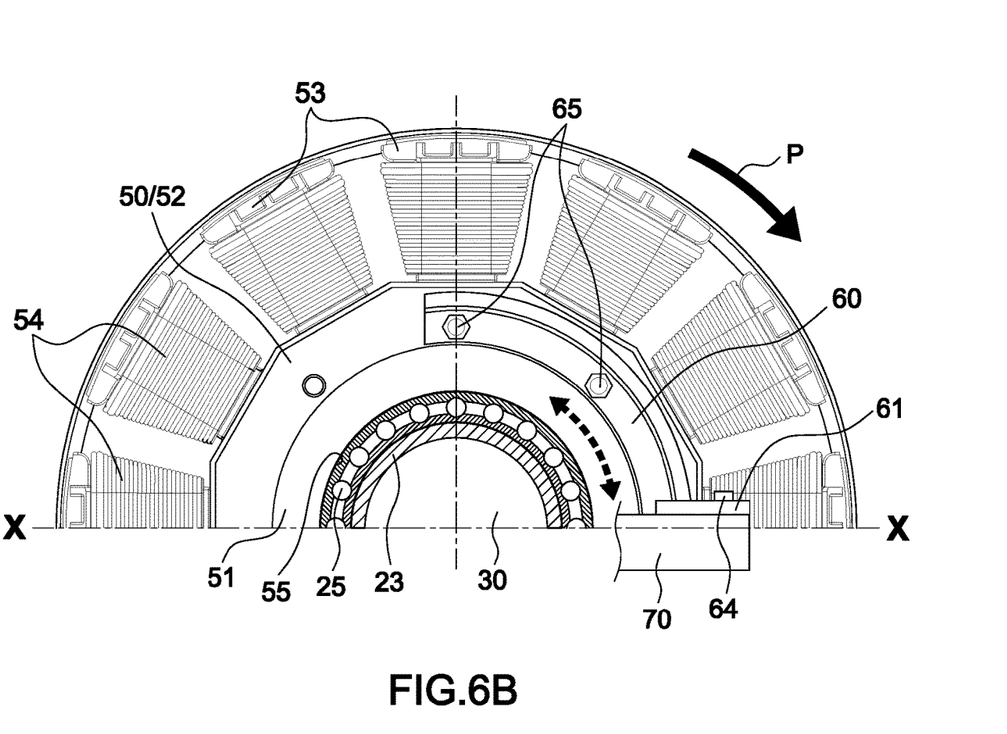
FIG. 6B is a schematic diagram illustrating the structure of the magnetic resistance mechanism floatingly pivoting.
Figure 6C:
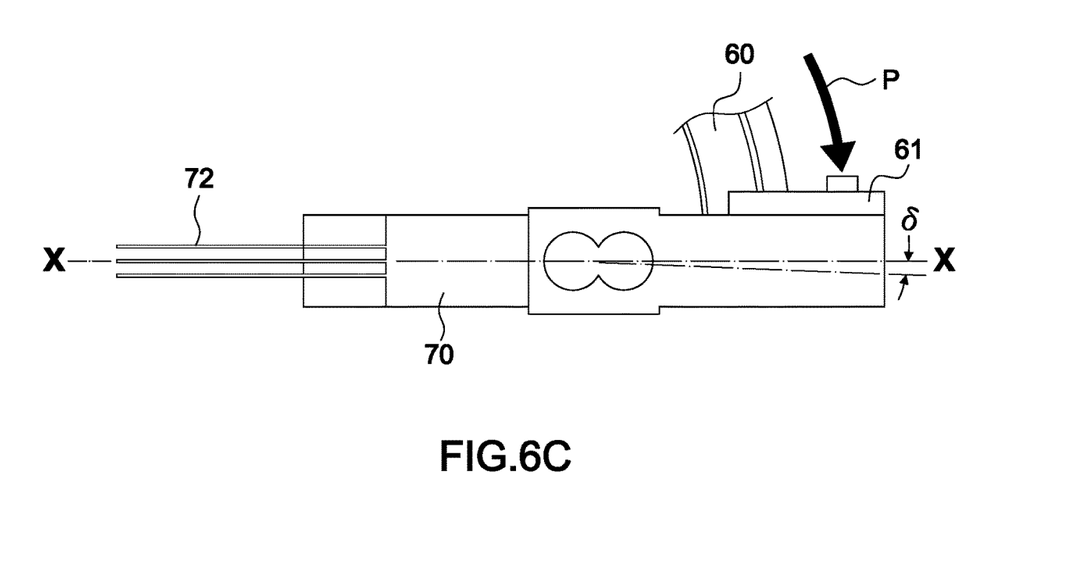
FIG. 6C is a schematic diagram illustrating the load cell while bearing load bearing load in the present invention.
Figure 7A:
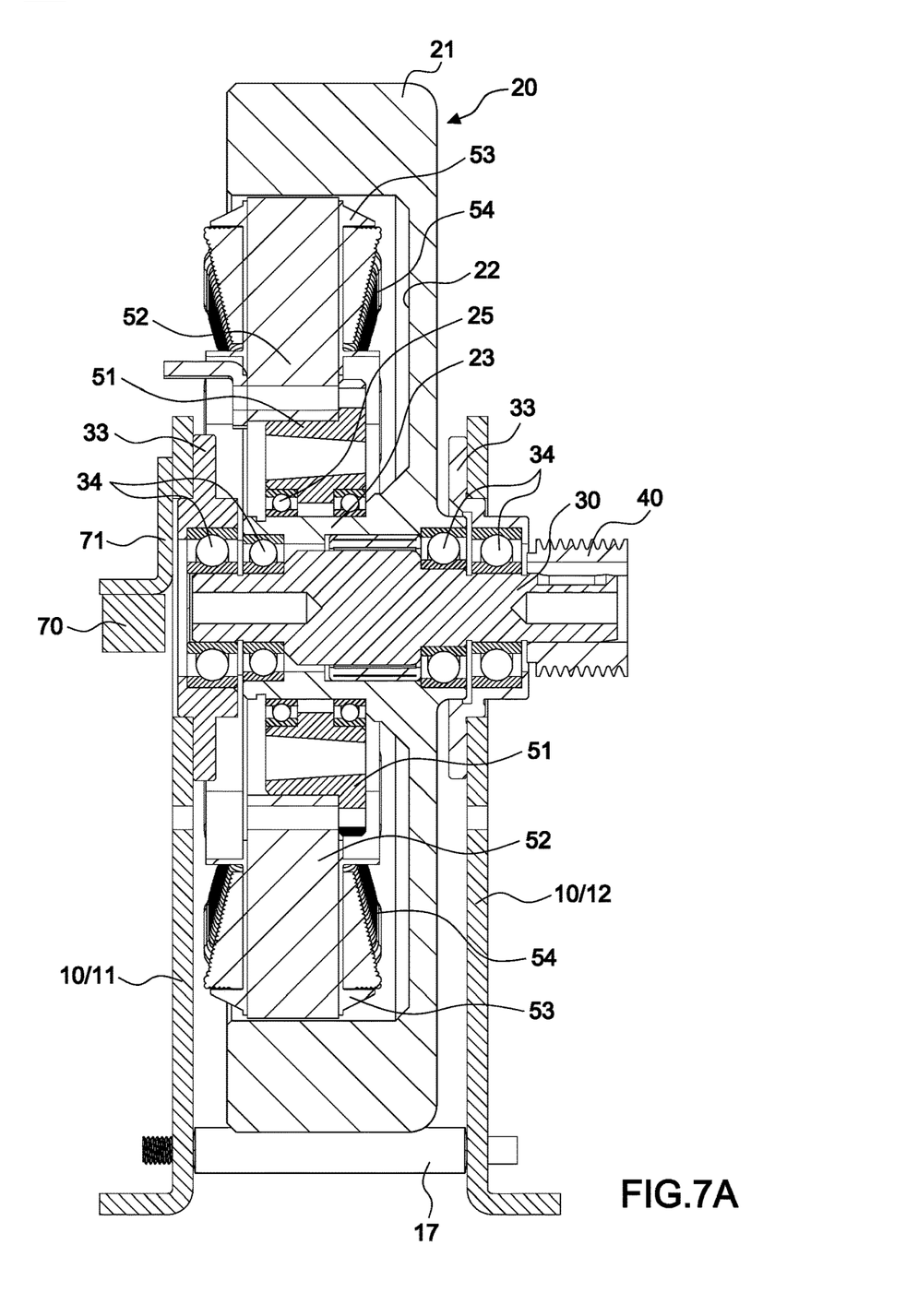
FIG. 7A is a sectional view taken along line 7-7 in FIG. 6A.
Figure 7B:
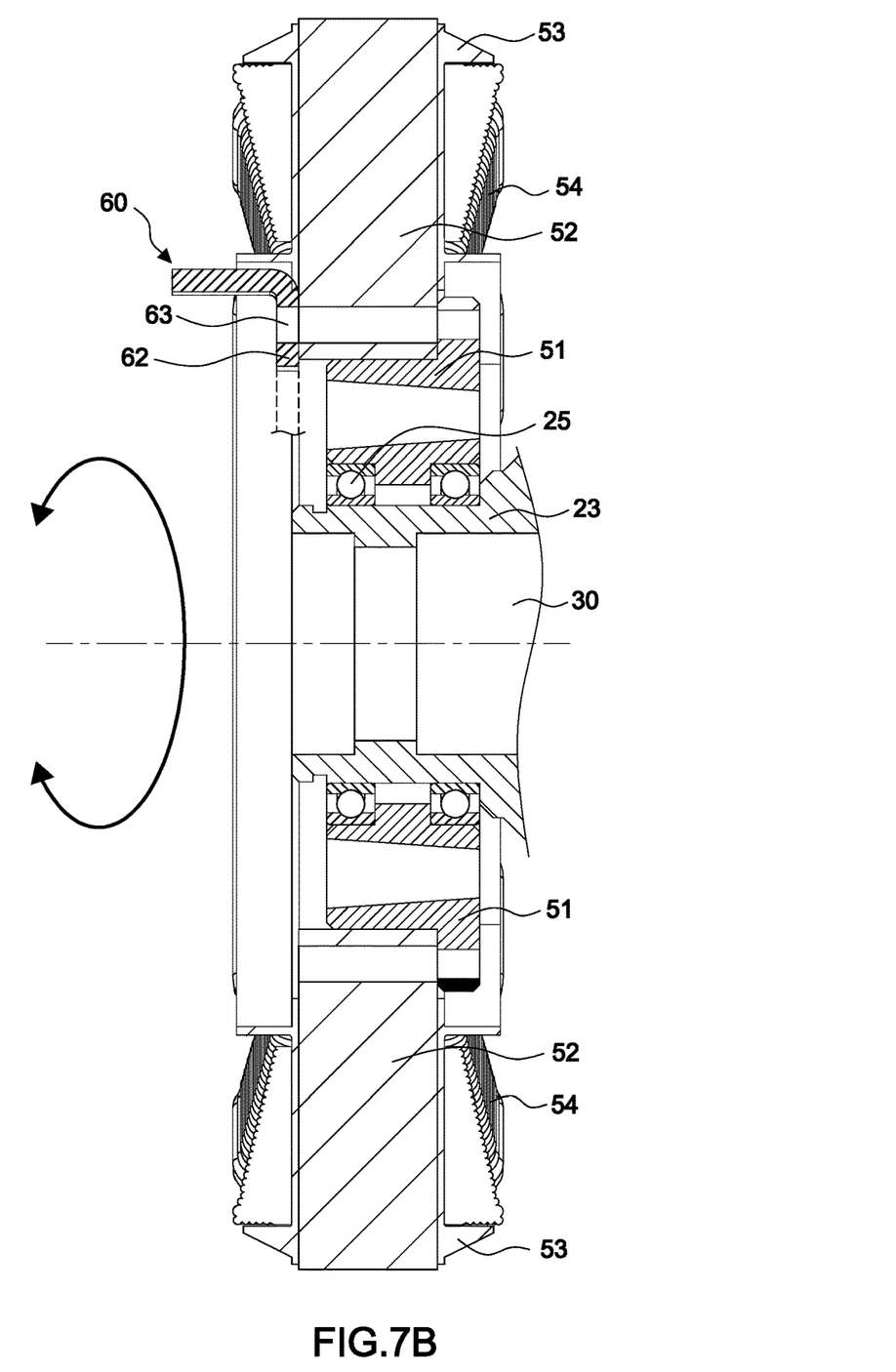
FIG. 7B is another sectional view taken along line 7-7 in FIG. 6A.

Referring to FIGS. 6A-7B, which show the status of the present invention when being applied with motion load, in this embodiment, the axial through hole 55 of the coil activity frame 51 of the magnetic resistance mechanism 50 is linked to a ball bearing 34 and set around the wheel nave 23 of the flywheel 20, so that the magnetic resistance mechanism 50 can freely pivot relative to the flywheel 20, as shown in FIG. 7.

The stator 52 of the magnetic resistance mechanism 50 has multiple brake field cores 53 and magnetic coils 54, where, when the DC current is transmitted to the magnetic coils 54, it will generate an eddy current on the brake field cores 53. Since the shaft center 30 is driven by the power transmitted by the fitness equipment to drive the flywheel 20 to rotate synchronously, the eddy current will be destroyed by the rotating flywheel and will further generate a resistance applied to the magnetic resistance mechanism 50, and, responsive thereto, the magnetic resistance mechanism 50 will generate a resistance value P applied to the action lever 60 which is connected to it, as shown in FIG. 6B and FIG. 6C. The resistance value P will further act on the beam load cell 70 through the pressure applied member 61, where one end of it will bear the shear force acting to the elastic body of the beam load cell 70 to generate a shear strain $\delta$, as shown in FIG. 6C, and the strain amount will be converted into a load value and transmitted to the control circuit unit 80 via an electrical connection.

The working principle of the beam load cell 70 is as follows: when one end of the application mechanism is subjected to the shearing force, the elastic body of the mechanism will produce shear strain, and its strain will change the resistance value attached to the mechanism. Because the system applies a fixed power supply, the partial pressure passing through the beam load cell will change accordingly, and after the changed partial pressure value is measured, the signal can be amplified and calculated to be converted into the shear force that the mechanism bears, that is, the load value. The working principle of the beam load cell is not the main focus of the present invention, but, since the inventor uniquely installed the mechanism under the operating rod by applying the beam load cell 70 to connect the magnetic resistance mechanism 50 to drive the action rod 60, the shear force of the elastic body can be sensed and converted into a load value, and then transmitted to the system to achieve a control effect.

FIG. 8 is a schematic diagram of the control of the present invention, wherein a control circuit unit 80 is arranged at the lateral side of the supporting frame 10. The control circuit unit 80 includes a micro processor control interface 81 electrically connected to the torque value conversion unit 82, for converting the load value 73 borne by the beam load cell 70 into a torque value, a power control unit 83, and a DC power supplier 84 which is connected to the AC power. The micro processor control interface 81 has an input unit for providing the desired torque value, and is electrically connected to the input line 56 and the beam load cell 70 of the magnetic coil 54. The control circuit unit 80 generates a control signal to form an appropriate current after the control circuit unit 80 calculated the desired torque value and simultaneously input to the magnetic coil 54 of the magnetic resistance mechanism 50, then the current of the magnetic coil 54 will form an eddy current on the brake field core 53. Since the flywheel 20 is rotating, when the eddy current is destroyed by the rotating flywheel 20, it will produce a resistance to resist, and the resistance will drive the magnetic resistance mechanism 50 to floatingly pivot, and by applying the resistance to the beam load cell 70 by the action lever 60, the control circuit unit 80 will repeatedly capture the resistance value which is a load value 73 to compare with the desired torque value, and then further change the delivered current, so that the actual load reaches the exercise effect of the desired torque value.

The flywheel 20 is driven by the shaft center 30 to rotate, the magnetic resistance mechanism 50 is arranged at the inner periphery of the outer ring body 21 of the flywheel 20, and has multiple brake field cores 53 and magnetic coil 54. Since the magnetic resistance mechanism 50 of the present invention is arranged at the inner periphery of the flywheel 20, the size and the manufacturing cost can be reduced, so it is applicable for the small fitness equipment.

In addition, the present invention controls the magnetic resistance load by the magnitude of the current applied to the magnetic coil 54, and, since the mechanism is a non-contact resistance device, the present invention also has the advantages of an easy control of resistance, no wear of components, and low maintenance cost.

Also, the present invention includes a flywheel 20 that provides inertial rotation, and the magnetic resistance mechanism 50 is arranged on the inner periphery of the outer ring body 21 of the flywheel 20. An appropriate current is input to the magnetic coil 54 of the magnetic resistance mechanism 50, then the current of the magnetic coil 54 will form an eddy current on the brake field core 53, and then cause a resistance to the rotation of the flywheel 20. Since the brake field core 53 is set at the inner periphery of the flywheel 20, the resistance of the eddy current will be evenly distributed on the inner periphery of the flywheel 20, so the present invention can provide a symmetrical and smooth load effect.

Moreover, the micro processor control interface 81 of the present invention has an input unit for inputting the desired torque value, where the micro processor will generate a suitable current through the torque value conversion unit 82 to the magnetic coil 54 of the magnetic resistance mechanism 50 to form an eddy current on the brake field core 53 so as to provide a resistance to the rotation of the flywheel 20. Because the beam load cell 70 is connected to the magnetic resistance mechanism 50 through the action lever 60 to measure its resistance, the control circuit unit 80 repeatedly captures the resistance to compare with the desired torque value, and then the delivered current is further changed, so that the load value reaches the desired torque value. Because the beam load cell 70 is used as the actual load sensing device in the present invention, and the control circuit unit 80 will send the feedback signal to correct the magnitude of the current it delivered, then the accuracy of its load can be increased to more than 95%, so that the present invention truly fits the user's exercise benefit.

Although particular embodiments of the invention have been described in detail for purposes of illustration, various modifications and enhancements may be made without departing from the spirit and scope of the invention. Accordingly, the invention is not limited except as by the appended claims.

What is claimed is:

1. A magnetic control device for directly sensing a motion load value applied to a fitness equipment, comprising:

- a supporting frame having a front frame body and a rear frame body fixed by multiple positioning rod, the supporting frame having a fixing base for fixing on the frame of the fitness equipment;
- a flywheel having an outer ring body at an outer periphery of said flywheel and a wheel nave arranged at a center of said flywheel, the wheel nave having a shaft hole for setting the wheel nave on the shaft center, wherein the shaft center drives the flywheel to rotate;
- a shaft center pivoted in a shaft hole of the wheel nave for receiving power transmitted by the fitness equipment;
- a magnetic resistance mechanism, wherein the magnetic resistance mechanism includes a coil activity frame disposed in a surrounding relationship with the wheel nave and being active for making the magnetic resistance mechanism floatingly pivot relative to an inner periphery of the outer ring body of the flywheel, a stator arranged at the outer periphery of the coil activity frame inside the outer ring body of the flywheel and surrounded with multiple brake field cores, wherein the brake field cores have a containing space for arranging therein a magnetic coil, and an input line connected to the magnetic coil;
- an action lever, wherein one end of the action lever is secured outside the magnetic resistance mechanism and is linked by a side edge thereof to the magnetic resistance mechanism, and wherein a pressure applied member is disposed at another end of the action lever;
- a beam load cell secured to the supporting frame by a load cell bracket, wherein an outer end of the beam load cell is connected to the pressure applied member, and wherein an inner end of the beam load cell has a load signal output line for sending the motion load value;
- a torque value conversion unit for converting the motion load value received by the beam load cell into a torque value; and
- a control circuit unit arranged at a lateral side of the supporting frame, the control circuit unit including at least a micro processor control interface electrically connected to the torque value conversion unit, a power control unit, and a DC power supplier which connected to an AC power, wherein the control circuit unit is configured to input a desired torque value, and wherein the control circuit unit is electrically connected to the input line of the magnetic resistance mechanism and the beam load cell, wherein the control circuit unit generates a control signal to form an appropriate current after the control circuit unit calculates the desired torque value and inputs the appropriate current to the magnetic coil of the magnetic resistance mechanism, wherein the appropriate current in the magnetic coil subsequently generates an eddy current in the brake field cores, wherein the generated eddy current produces a resistance to the rotation of the flywheel, wherein the resistance subsequently drives the magnetic resistance mechanism to floatingly pivot relative to the inner periphery of the outer ring body of the flywheel, and wherein the resistance is applied to the beam load cell by the action lever, thus resulting in capturing a resistance value of the resistance by the control circuit unit, wherein the control circuit unit is further configured to compare the resistance value with the desired torque value, and to subsequently change the appropriate current supplied to the magnetic coil to result in attaining of an actual load corresponding to the desired torque value.

2. The magnetic control device for directly sensing the motion load value as claimed in claim 1, further comprising at least one ball bearing arranged between the coil activity frame and the wheel nave of the flywheel for the coil activity frame to floatingly pivot relatively to the flywheel.

3. The magnetic control device for directly sensing the motion load value as claimed in claim 1, further comprising a belt wheel disposed on the shaft center outside the supporting frame for transmitting power from the fitness equipment to the shaft center.

* * * * *